United States Patent [19]
Dunwoodie

[11] 3,774,107
[45] Nov. 20, 1973

[54] MEANS FOR SHUNTING SELECT SIGNALS ACROSS AN UNKNOWN IMPEDANCE AND BLOCKING SAID SIGNALS FROM A MEASURING SYSTEM

[75] Inventor: Duane E. Dunwoodie, Los Altos, Calif.

[73] Assignee: Wiltron Company, Palo Alto, Calif.

[22] Filed: Mar. 17, 1972

[21] Appl. No.: 235,574

[52] U.S. Cl. ........................... 324/57 R, 324/DIG. 1
[51] Int. Cl. ........................................... G01r 27/00
[58] Field of Search ...................... 324/57 R, DIG. 1

[56] References Cited
UNITED STATES PATENTS

| | | | |
|---|---|---|---|
| 2,162,894 | 6/1939 | Logan | 324/DIG. 1 |
| 2,505,072 | 4/1950 | Sunstein | 324/DIG. 1 |
| 2,508,446 | 5/1950 | Conant | 324/DIG. 1 |
| 2,570,218 | 10/1951 | Draganjac | 324/DIG. 1 |

FOREIGN PATENTS OR APPLICATIONS

| | | | |
|---|---|---|---|
| 497,133 | 5/1930 | Germany | 324/DIG. 1 |

*Primary Examiner*—Stanley T. Krawczewicz
*Attorney*—Karl A. Limbach et al.

[57] ABSTRACT

An impedance measuring system with a reference impedance including a network for delivering or absorbing current to or from the impedance being measured. The system uses a second network to cancel the measurement inaccuracy otherwise introduced by the first network.

7 Claims, 4 Drawing Figures

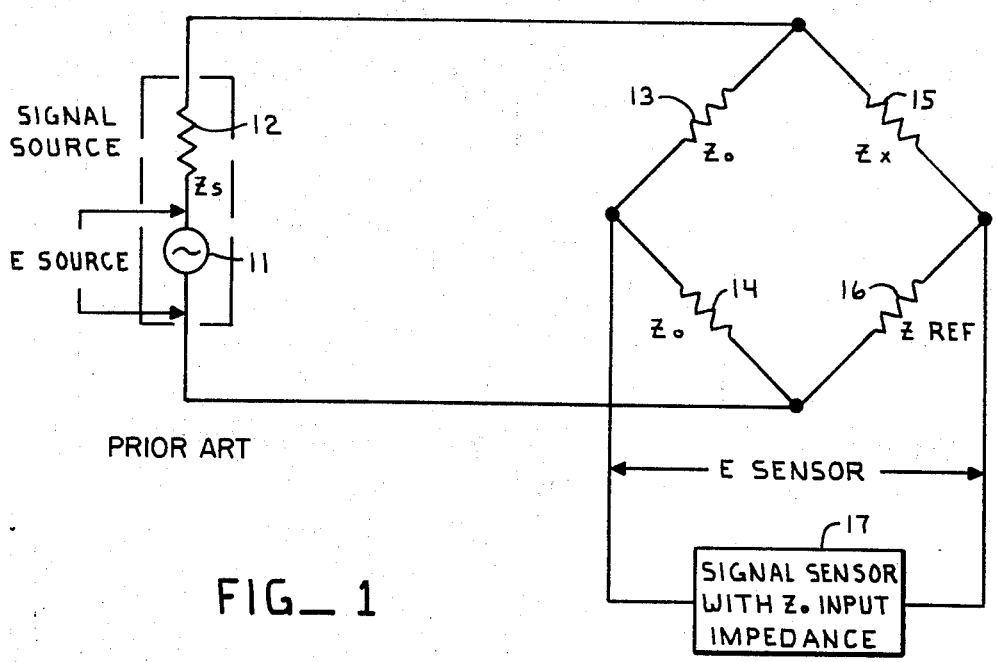
FIG_1
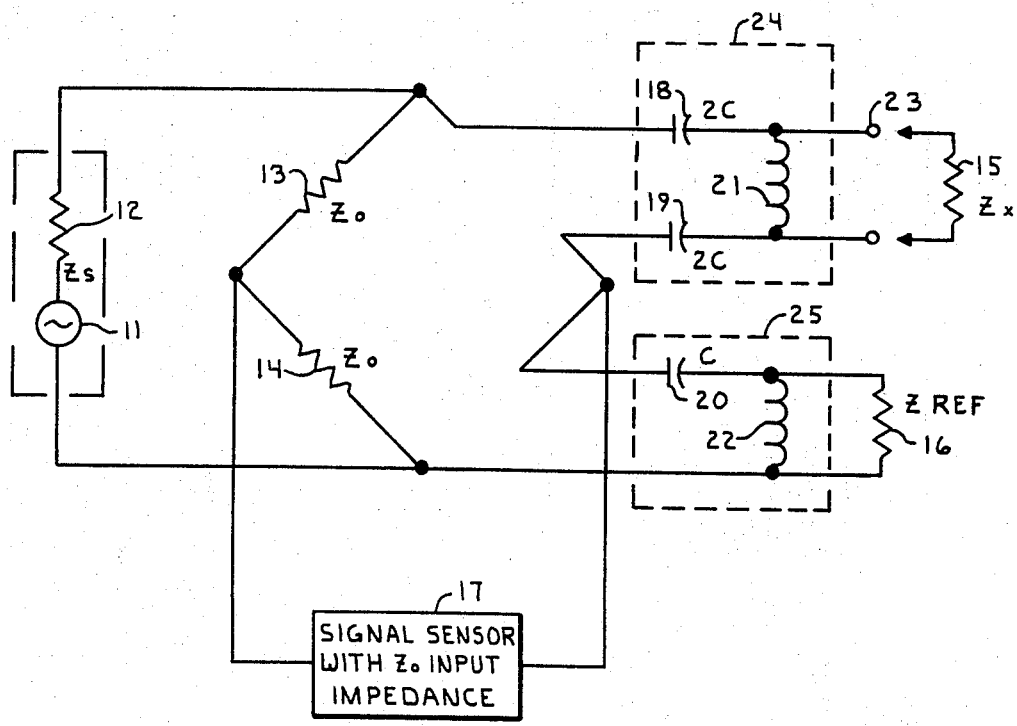
FIG_2

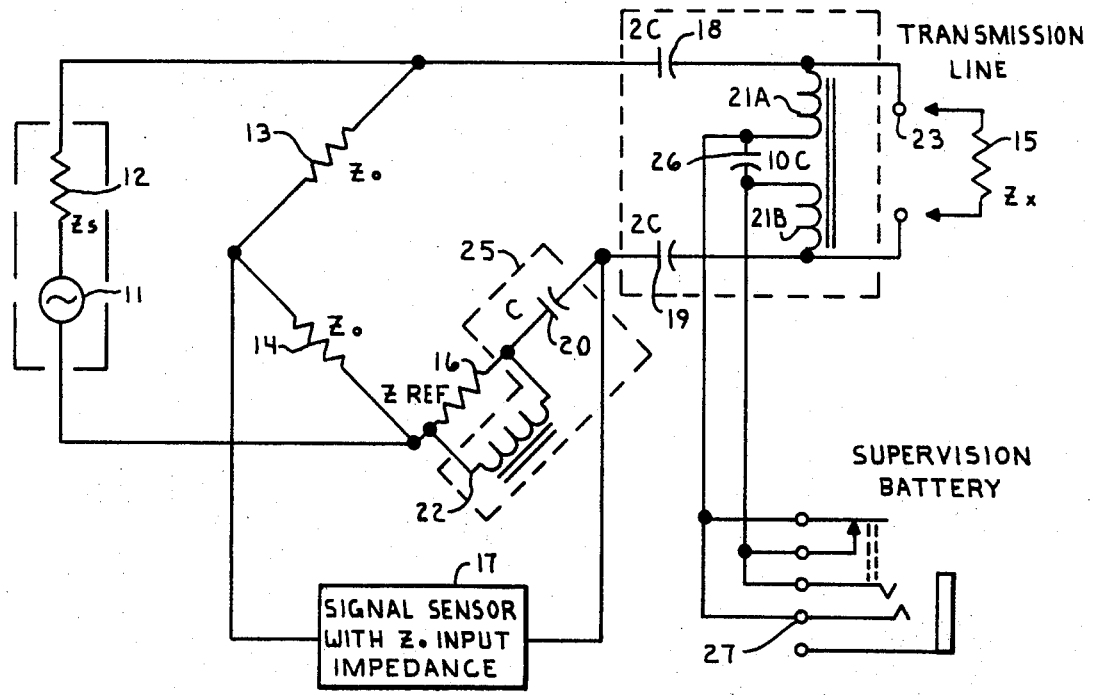
FIG_3
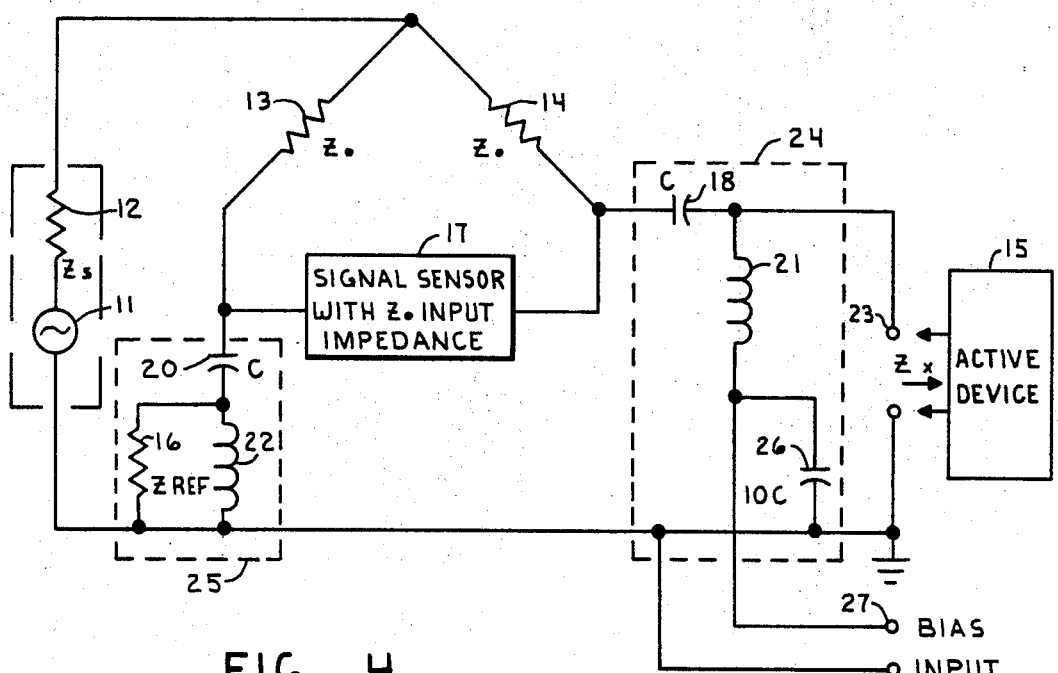
FIG_4

MEANS FOR SHUNTING SELECT SIGNALS ACROSS AN UNKNOWN IMPEDANCE AND BLOCKING SAID SIGNALS FROM A MEASURING SYSTEM

BACKGROUND OF THE INVENTION

The present invention is related to ac impedance measurement and more particularly to a bridge circuit with means for accommodating dc current flow.

It is usually necessary when measuring parameters on active devices to establish dc operating potentials or currents for the device. The networks connected for this purpose place a shunting impedance across the unknown being measured and cause measurement error.

Another major application is in the telephone industry where trunk line impedance must be controlled. To make measurements on a line it is necessary to provide a dc path across the line and pass current up to 200 milliamperes. This current flow is required to "hold" the line by maintaining the relays operating in the exchange. Again, the shunting impedance necessary to provide this dc path causes an error in the measured impedance.

OBJECTS AND SUMMARY OF THE INVENTION

It is, therefore, an object of the present invention to provide accurate measurements while providing a shunt dc path across the unknown impedance.

Another object of the invention is to permit dc current of significant levels to be passed through the measuring terminals with minimum disturbance of the measurement.

A still further object of the invention is to satisfy the first mentioned objectives in a manner that is economical, light weight and small in size.

Representative embodiments of this invention are herein presented, but it will, of course, be appreciated that the invention is susceptible of incorporation in still other forms coming equally within the scope of the appended claims.

In accordance with the above objectives, there is provided a bridge measurement circuit with ac drive means and detection means where the unknown impedance becomes one arm of the bridge and an adjacent arm is called the reference impedance. A first circuit network means is placed between the unknown impedance and the bridge providing dc blocking to the bridge and a dc shunt path across the load. A second circuit network means is placed between the reference impedance and the bridge providing a counterbalancing impedance to nullify the error introduced by the first circuit network means.

BRIEF DESCRIPTION OF THE DRAWINGS

FIG. 1 is a simplified schematic circuit of a conventional bridge circuit;

FIG. 2 is a simplified schematic circuit embodying the present invention;

FIG. 3 is a simplified schematic circuit illustrating a more complete application; and FIG. 4 is a simplified schematic circuit illustrating an alternate use of the invention.

DETAILED DESCRIPTION OF THE PREFERRED EMBODIMENT

Referring now to FIG. 1 is a representative impedance measuring system using a bridge consisting of elements 13, 14, 16 and the unknown impedance 15. The bridge is driven by a signal source 11 with internal impedance 12. The output signal from the bridge is connected to the signal sensor 17 having a finite input impedance. Common utilization of this bridge uses the value $R_o$ for elements 12, 13, 14, 16 and the input impedance of 17. Other selected values may be chosen to fulfill the requirement on measurement output next given. In these cases, the voltage to the sensor has a magnitude proportional to the reflection coefficient of the unknown impedance. This relationship is E sensor = E source/8 $(Z_x - R_o)/(Z_x + R_o)$ where $Z_x$ and $R_o$ may be phasors.

Referring to FIG. 2 is an impedance measuring system having the elements described in FIG. 1, having a first network 24 with inductance 21 connected in parallel with the measurements terminals 23 so as to provide a dc path for current which may be emanating from the unknown impedance 15. This network contains series connecting capacitors 18 and 19 to block dc from the measuring bridge. A second network means 25 places an inductor 22 in parallel with the reference impedance 16 to balance the effect of the first network 21. Similarly, the second network includes capacitor 20 to balance the combined effects of capacitors 18 and 19 in the first network.

With this inclusion of the second network, the bridge balance is preserved while permitting normal operating signals or bias currents to flow through the unknown impedance so that a realistic impedance measurement is achieved. A high degree of accuracy is attainable under these conditions. Alternatively, for a given degree of accuracy, smaller or less expensive elements 21, 18 and 19 may be utilized by having the cancelling effects of the second network. In a typical application, the inclusion of the second network will give a 20 to 30dB reduction in the error signal introduced by the presence of the first network.

FIG. 3 details a measuring system which uses a split inductor 21A,B to permit injecting current or bias voltage through connector 27 to the unknown impedance 15. Capacitor 26 provides an ac short across the external line source. This configuration is particularly suitable for measurements on balanced transmission lines.

FIG. 4 shows a similar bridge configuration connected for an unbalanced measurement of the impedance of an active device. The first network 24 includes a bias choke 21 coupling the bias input 27 to the active device representing the unknown impedance 15. Capacitor 26 bypasses ac signals from the bias input and capacitor 18 blocks dc bias from the measuring bridge. The second network 25 provides a balancing inductance 22 and the balancing capacitor 20 to cancel the error contributions of the first network. With this measuring system, active devices may be powered while impedance measurements are taken and still obtain accurate impedance measurement.

Thus, the present invention provides a second network to cancel the effects of a first network required for supporting practical voltage or current feeds to an unknown impedance.

The invention claimed is:

1. An impedance measuring system with a reference impedance and with an output signal sensor responsive to an unknown impedance in relation to the reference impedance, in combination with means for shunting select signals across the unknown impedance and blocking the signals from the measuring system said means including:
- a first network means connected between the measuring system and the unknown impedance for providing a frequency selective path in shunt with the unknown impedance, and,
- a second network means connected between the measuring system and the reference impedance for cancelling the effect of the presence of the first network means in measuring the unknown impedance.

2. An impedance measuring system as described in claim 1 wherein said system is responsive to a.c. signals and said means for shunting select signals shunts d.c. signals across the unknown impedance and blocks d.c. signals from the measuring system.

3. An impedance measuring system as described in claim 1 wherein said first network means includes means for injecting select signals to said unknown impedance.

4. An impedance measuring system having a bridge circuit including an unknown impedance and a reference impedance, and having an output signal sensor responsive to the unknown impedance in relation to the reference impedance, in combination with means for shunting select signals across the unknown impedance and blocking the signals from the measuring system said means including:
- a first network means connected between the measuring system and the unknown impedance for providing a frequency selective path in shunt with the unknown impedance, and,
- a second network means connected between the measuring system and the reference impedance for cancelling the effect of the presence of the first network means in measuring the unknown impedance.

5. An impedance measuring system as described in claim 4 wherein said system is responsive to a.c. signals and said means for shunting select signals shunts d.c. signals across the unknown impedance and blocks d.c. signals from the measuring system.

6. An impedance measuring system as described in claim 5 wherein said first network means includes means for injecting select signals to said unknown impedance.

7. In an impedance measuring bridge circuit with a reference impedance for measuring an unknown impedance by relation to the reference impedance, a method of measuring the impedance of an unknown impedance which concurrently has select signals applied thereto comprising the steps of:
- first, shunting the select signals across the unknown impedance and blocking the select signals from the measuring bridge by a first circuit network arranged between the unknown impedance and the impedance measuring bridge; and
- second, compensating for the presence of the first circuit network by a complementary second circuit network arranged between the reference impedance and the impedance measuring bridge.

* * * * *